United States Patent Office 3,567,699
Patented Mar. 2, 1971

3,567,699
SULFUR-VULCANIZABLE COPOLYMERS OF ALPHA-OLEFINS AND POLYALKENYL-CYCLOALKANES AND PROCESS FOR PRODUCING SAME
Giulio Natta, Giorgio Mazzanti, Alberto Valvassori, and Vittorio Turba, Milan, Italy, and Guido Sartori, Roselle, N.J., assignors to Montecatini Edison S.p.A., Milan, Italy
No Drawing. Continuation of application Ser. No. 623,177, Mar. 8, 1967, which is a continuation-in-part of application Ser. No. 273,316, Apr. 16, 1963. This application Oct. 22, 1969, Ser. No. 868,650
Claims priority, application Italy, Apr. 18, 1962, 7,639/62
Int. Cl. C08f 15/40, 27/06
U.S. Cl. 260—79.5          12 Claims

ABSTRACT OF THE DISCLOSURE

There are disclosed vulcanizable, substantially linear, substantially amorphous, high molecular weight copolymerizates of ethylene and/or a higher alpha-olefin having the general formula $CH_2=CH-R$ in which R is an alkyl group containing 1 to 6 carbon atoms, and polyalkenyl-cycloalkanes containing 3 to 4 carbon atoms in the cycle.

---

This application is a continuation of application Ser. No. 623,177 filed Mar. 8, 1967 now abandoned which is a continuation-in-part of our application Ser. No. 273,316 filed Apr. 16, 1963.

More particularly, the invention relates to sulfur-vulcanizable, substantially linear, substantially amorphous, high molecular weight copolymerizates of the aforementioned monomers characterized in consisting of macromolecules made up of polymerized units of each of the starting monomers.

The invention also provides a process for producing said copolymerizates.

The preparation of amorphous copolymers of ethylene and/or the higher alpha-olefins with conjugated or non-conjugated, linear or cyclic dienes or with alkenylcycloalkenes has been described.

It is known, also, that linear, aliphatic diolefins can be polymerized to cyclic structures (inter- or intra-molecular polymerization).

The preparation of sulfur-vulcanizable copolymers of at least one terminally unsaturated straight chain mono-olefin containing 2–6 carbon atoms per molecule with a trivinyl monocycloalkane in which the cycloalkane ring has 5–6 carbon atoms in the ring has also been described.

The last-mentioned copolymers prepared as disclosed in the art have not been found to yield elastomers having the mechanical properties required for commercial purposes, on vulcanization thereof with the aid of conventional sulfur-containing vulcanizing recipes.

Thus, when ethylene, propylene and a mixture of 1,2,4- and 1,3,5-trivinylcyclohexane were copolymerized at 60° C. in an inert diluent (isooctane) and in contact with a catalyst prepared from $VOCl_3$ and ethyl-aluminum sesquichloride, the polymerization products obtained showed, probably due to the existence of cross-links therein, only a partial solubility in tetrahydronaphthalene at 135° C., and exhibited a relatively large percent of polyethylenic crystallinity when submitted to X-ray analysis.

On vulcanizing such copolymerizate of the prior art by mixing 100 parts by weight thereof with 1.0 part of phenyl-beta-naphthylamine, 2.0 parts of sulfur, 5.0 parts of zinc dioxide, 1.0 part of tetramethylthiuram disulphide, 0.5 part of mercaptobenzothiazole, and 50 parts of HAF black, and heating the mix in a press for 30 minutes at 150° C., there was obtained a vulcanized lamina having the following characteristics:

Tensile strength—60 kg./cm.$^2$
Elongation at break—110%
Permanent set—12%

As will be apparent, the characteristics of the vulcanizate are very poor, the extremely low value of 110% for the elongation at break being particularly disadvantageous.

An object of this invention is to provide sulfur-vulcanizable, substantially amorphous copolymerizates of ethylene and/or a higher alpha-olefin with polyalkenyl-cycloalkanes containing 3–4 carbon atoms in the cycloalkane ring, which copolymerizates are completely soluble in boiling tetrahydronaphthalene and, when vulcanized with the aid of conventional sulfur-containing recipes, yield vulcanizates having unexpectedly superior elastomeric properties.

Another object is to provide a process for obtaining the copolymerizates completely soluble in boiling tetrahydronaphthalene and sulfur-vulcanizable to the vulcanizates having the mechanical properties of a commercially acceptable synthetic rubber.

These and other objects are accomplished by copolymerizing a mixture of ethylene, and/or the higher alpha-olefin, and polyalkenylcycloalkanes containing 3–4 carbon atoms in the cycloalkane ring, in contact with an anionic catalyst prepared by mixing a hydrocarbon-soluble vanadium compound and organometallic compounds or complexes of aluminum or organometallic compound of beryllium, at least one of these catalyst-forming components being halogenated.

Polyalkenylcycloalkanes used in practicing the invention include, as such or in mixtures thereof:

trans-1,2-divinylcyclobutane
cis-1,2-divinylcyclobutane
trans-1,2-divinylcyclopropane
1-vinyl-2-isopropenylcyclobutane
diallylcyclobutane
1,2-divinyl-1-methylcyclobutane
1,2-divinyl-1,2-dimethylcyclobutane
1-vinyl-1-methyl-2-isopropenylcyclobutane
1-vinyl-2-methyl-2-isopropenylcyclobutane
1-vinyl-2-propenyl-cyclobutane
1-vinyl-2-propenyl-3-methyl-cyclobutane
divinyl-methylallyl-cyclobutane
divinyl-butenyl-cyclobutane For instance, by copolymerizing a mixture of ethylene, propylene and/or butene, and trans-1,2-divinylcyclobutane, by the process of this invention, there is obtained a crude copolymerization product which consists of linear macromolecules each containing randomly distributed polymerized units of ethylene, propylene (and/or butene-1) and the divinylcyclobutane, and which when vulcanized under conventional conditions, with the aid of conventional sulfur-containing mixes (and as shown in Example 1 below) yields even in the absence of carbon black, a vulcanizate having a tensile strength of 23.3 kg./cm.$^2$; an elongation at break of 500%; a modulus at 300% of 10.5 kg./cm.$^2$; and a permanent set at break of 8%.

The characteristics of the vulcanizates, even without the use of carbon black as filler, are very good, the high elongation at break being particularly noteworthy.

Each polymerized unit of the dialkenyl or polyalkenyl cycloalkane in the macromolecules still contains one or more free unsaturations. For instance, in the case of copolymers obtained from the dialkenyl or polyalkenyl cycloalkanes in which the double bonds are of vinyl type, the infrared spectrum shows the presence of bands at 10 and 11 microns, attributable to the presence of vinyl groups. The copolymerizates are random.

Moreover, the infrared spectrum of these copolymers shows an absorption band at 10.35 microns due to the presence of trans double bonds originated by opening of the cycle during the copolymerization.

The copolymerizates of the invention have a molecular weight, determined viscosimetrically, higher than 20,000 and corresponding to an intrinsic viscosity in excess of 0.5 as determined in tetrahydronaphthalene at 135° C., or in toluene at 30° C. [G. Moraglio "La Chimica e l'Industria 41 10 (1959) 984–987]. The intrinsic viscosity of these copolymers can vary from 0.5 up to 10 or higher. For most practical purposes, however, the copolymers having an intrinsic viscosity of between 1 and 5 are preferred.

The copolymerizates are homogeneous, both in being substantially free of homopolymers of the respective starting monomers and also in having sites of unsaturation distributed substantially uniformly along the macromolecular main chain.

The organometallic compounds used as one catalyst-forming component are aluminum or beryllium compounds, such as aluminum trialkyls, aluminum dialkyl monohalides, aluminum mono-alkyldihalides, aluminum alkenyls, aluminum alkylenes, aluminum cycloalkyls, aluminum cycloalkyl-alkyls, aluminum aryls, aluminum alkyl aryls, lithium-aluminum tetraalkyls, beryllium dialkyls, beryllium alkylhalides, beryllium diaryls, aluminum compounds in which the metal is linked by main valences not only to carbon and halogen atoms but also to oxygen atoms bonded to an organic group, such as aluminum dialkylalkoxides, and aluminum alkylalkoxyhalides, and complexes of the aforementioned organic aluminum compounds with preferably weak Lewis bases.

Examples of specific useful organometallic aluminum and beryllium compounds include: aluminum triethyl, aluminum triisobutyl, aluminum trihexyl, diethyl aluminum monochloride, diethyl aluminum monoiodide, diethyl aluminum monofluoride, diisobutyl aluminum monochloride, monoethyl aluminum dichloride, aluminum butenyl diethyl, aluminum isohexenyl diethyl, 2-methyl-1,4-(diisobutyl aluminum)butane, aluminum tri(cyclopentylmethyl), aluminum tri(dimethylcyclopentylmethyl), aluminum triphenyl, aluminum tritolyl, aluminum di(cyclopentylmethyl)monochloride, aluminum diphenyl monochloride, aluminum diisobutyl monochloride complexed with anisole, lithium-aluminum tetrahexyl, lithium-aluminum tetrabutyl, beryllium diethyl, beryllium methylchloride, beryllium dimethyl, beryllium di-n-propyl, beryllium diisopropyl, beryllium di-n-butyl, beryllium di-t. butyl, beryllium diphenyl, aluminum monochloromonoethylmonoethoxide, aluminum diethylpropoxide, aluminum diethylamyloxide, aluminum monochloro-monopropyl-monopropoxide, aluminum monochloromonopropylmonoethoxide.

The hydrocarbon-soluble vanadium compounds used as one catalyst-forming component are the halides and oxyhalides, e.g., $VCl_4$, $VOCl_3$, $VBr_4$ and the compounds in which at least one of the metal valences is saturated with a heteroatom (more particularly oxygen and nitrogen) bound to an organic group such as, for example, vanadium triacetylacetonate, vanadium tribenzoylacetonate, vanadyl diacetylacetonate and halogen acetylacetonates, vanadyl trialkoxides and halogen alkoxides; also tetrahydrofuranates, etherates and aminates of vanadium tri- and tetra-chloride and of vanadyl trichloride, quinolinates and pyridinates of vanadium tri- and tetra-chloride, and of vanadyl trichloride.

When the hydrocarbon-soluble vanadium compound contains halogen, as when it is a halide or oxyhalide, any of the aforementioned aluminum and beryllium compounds can be used as one catalyst-forming component. However, when the hydrocarbon-soluble vanadium compound is halogen-free, as when it is a vanadium compound in which the metal valences are saturated with oxygen or nitrogen atoms bound to an organic group, the halogen-containing aluminum or beryllium compounds are used as one catalyst-forming component.

The copolymerization of the above-described starting comonomers is carried out, according to this invention, at a temperature in the range 0° to −80° C.

When catalysts based on aluminum alkylhalides are used, the highest yields of these copolymerizates per weight unit of catalyst used and the best properties of the copolymers are obtained when both the catalyst preparation and the copolymerization are carried out at temperatures in the range of 0° C. to −50° C.

Operating under the stated temperature conditions, of from 0 to −50° C., the catalysts are much more highly active than the same catalytic systems prepared at higher temperatures.

Moreover, by operating in the stated low temperature range, the activity of the catalyst remains practically unaltered with time.

The activity of the catalysts used varies with the molar ratio between the compounds used in preparing the catalyst.

According to the present invention, it has been found that when, for example, aluminum trialkyls and vanadium halides or oxyhalides are employed, these catalysts having a molar ratio of the aluminum trialkyl to vanadium compound, between 1 and 5 and preferably between 2 and 4, are superior. If, on the contrary, aluminum diethyl monochloride $Al(C_2H_5)_2Cl$ and vanadium triacetylacetonate ($VAc_3$) are used, optimum results are obtained with an $Al(C_2H_5)_2Cl/VAc_3$ molar ratio between 2 and 20, and preferably between 4 and 10.

The copolymerization of the present invention can be carried out in the presence of a hydrocarbon solvent selected from aliphatic, cycloaliphatic or aromatic hydrocarbons, e.g., butane, pentane, heptane, cyclohexane, toluene, xylene or mixtures thereof. Halogenated hydrocarbons which, under the polymerization conditions, do not react with the catalyst, such as chloroform, trichloroethylene, tetrachloroethylene, chlorobenzenes, etc., can also be used as solvents.

Particularly high yields of copolymer per catalyst unit weight can be obtained by carrying out the copolymerization in the absence of an inert solvent. This can be accomplished by using the monomers in the liquid state, e.g., a solution of ethylene in a mixture of the higher alpha-olefin and polyalkenylcycloalkane. When the copolymerization is carried out in the absence of inert solvents the di- or poly-alkenylcycloalkanes used should contain only one terminal vinyl double bond.

In order to obtain copolymers having a high homogeneity of composition, the ratio between the monomers to be copolymerized in the reacting liquid phase should be conveniently kept constant or as constant as possible. For this purpose it is convenient to carry out the copolymerization continuously by feeding and discharging a monomeric mixture having a constant composition, and by operating at high feeding rates.

The composition of the copolymers can be varied within wide limits by varying the composition of the monomeric mixture. When copolymers of ethylene with a selected polyalkenylcycloalkane such as 1,2-divinylcyclobutane are produced, in order to obtain amorphous materials having elastomeric properties it is necessary to regulate the composition of the starting monomers mixture so as to obtain copolymers having a relatively high content (preferably above 20% by weight) of the selected polyalkenylcycloalkane.

In general, the copolymerizates contain at least 5% of ethylene. The content of higher alpha-olefin may vary from a minimum of 5% by moles up to a maximum of about 95% by moles. Preferred copolymers, which result in vulcanizates having the best properties, contain from about 20% to about 70% by weight of ethylene. The polyalkenylcycloalkane content of the copolymerizates preferably ranges from 0.1% to 20% by moles and more preferably from 1 to 10% by moles.

If amorphous copolymerizates of the selected polyalkenylcycloalkane with ethylene and propylene are desired, a molar ratio of propylene to ethylene of at least 4:1 should be maintained in the reacting liquid phase. This corresponds to a propylene to ethylene molar ratio of 1:1 under normal conditions in the gaseous phase. Molar ratios in the liquid phase of 200:1 to 4:1 may be used and for the best vulcanizates to be obtained the molar ratio of propylene to ethylene in the reacting liquid phase is selected so as to result in a copolymerizate containing from about 20% to about 70% by weight of ethylene.

When butene-1 is used instead of propylene, the molar ratio of butene to ethylene maintained in the reacting liquid phase is at least 20:1, which corresponds to a molar ratio of butene-1 to ethylene under normal conditions in the gas phase of about 1.5:1. Molar ratios of butene-1 to ethylene in the liquid reacting phase of 1000:1 to 20:1 are used and in order to obtain the best vulcanized products, the molar ratio of butene-1 to ethylene maintained in the reacting liquid phase is selected to result in copolymerizates containing from about 20% to about 70% by weight of ethylene.

When the content of ethylene is near the upper limit of 70% by weight, the copolymerizates may exhibit, particularly under stretching, a polyethylenic crystallinity. The macromolecules may contain a higher proportion of polymerized units of the polyalkenylcycloalkane, but an upper limit of 20% by moles is sufficient and amounts in excess of 20% are, in general, uneconomical.

The present substantially amorphous copolymerizates obtained using the particular polyalkenylcycloalkanes (which term includes the dialkenylcycloalkanes) containing 3-4 carbons in the cycloalkane ring not only have the properties of non-vulcanized elastomers as evidenced by a very low initial modulus of elasticity and a very high elongation at break, and are not only vulcanizable by methods used conventionally for unsaturated rubbers, more particularly low unsaturation rubbers, due to the presence of unsaturations in the macromolecules thereof, but the vulcanizates obtained from these particular copolymerizates, under the conventional vulcanizing conditions, unexpectedly exhibit the mechanical properties which are looked for in commercially useful and acceptable elastomers (synthetic rubbers), indicating unexpected and unpredictable differences between these copolymerizates per se and copolymerizates obtained by copolymerizing monoolefins with polyalkenylcycloalkanes containing 5-6 carbon atoms in the cycle under conditions shown in the prior art.

The vulcanized products obtained by vulcanizing the present copolymerizates under conventional vulcanizing conditions have a high reversible elastic elongation and good tensile strength. The tensile strength is particularly high when the vulcanizing mix contains reinforcing fillers such as carbon black. The good mechanical properties of the elastomers (synthetic rubbers) resulting from the vulcanization render the elastomers useful in the preparation of commercially acceptable articles of various kinds, including manufactured shaped articles generally, pipes, sheets, elastic fibers, etc.

Petroleum oils in general can be used as extenders or plasticizers for the copolymerizates. Paraffinic and naphthenic oils are preferred; aromatic oils can also be used.

The following examples illustrate the invention:

EXAMPLE 1

The reaction apparatus comprised a glass cylinder having a diameter of 5.5 cm. and a capacity of 750 cc. provided with an agitator and gas inlet and outlet tubes, immersed in a thermostatic bath at −20° C.

The gas inlet tube reaches the bottom of the cylinder and ends with a porous diaphragm (diameter 3.5 cm.).

Into the reactor, kept under nitrogen, 200 cc. of anhydrous n-heptane and 7 cc. of trans 1,2-divinylcyclobutane are introduced.

Through the gas inlet tube a gaseous mixture of propylene and ethylene in the molar ratio of 4:1 was introduced and circulated at the rate of 200 N l./hour.

In a 100 cc. flask, kept at −20° C., the catalyst was preformed under nitrogen by reacting 2.8 millimols of vanadium triacetylacetonate and 14 millimols of aluminum diethyl monochloride in 30 cc. of anhydrous toluene. The catalyst thus preformed was kept at −20° C. for 5 minutes and was then siphoned into the reactor under nitrogen pressure.

The gaseous ethylene-propylene mixture was continuously fed at the rate of 400 N l./hour. After 20 minutes, from the beginning, a catalyst amount equal to the preceding one was preformed and siphoned into the reactor. After 80 minutes from the beginning, the reaction was stopped by adding 20 cc. of methanol containing 0.1 g. of phenyl-beta-naphthylamine.

The product was purified in a separating funnel, under nitrogen, by repeated treatments with diluted hydrochloric acid and then with water and was finally coagulated in acetone.

After vacuum drying, 13 g. of solid amorphous product which had the appearance of a non-vulcanized elastomer, and was completely soluble in boiling n-heptane, were obtained. The product had an intrinsic viscosity determined in toluene at 30° C. of 2.1.

The infrared spectrum of the product showed the presence of bands at 10 and 11 microns, attributable to the presence of vinyl groups. The ethylene-propylene molar ratio was 1:1.

100 parts by weight of ethylene-propylene-divinylcyclobutane were mixed in a laboratory roll mixer with 1 part of phenyl-beta-naphthylamine, 2 parts of sulfur, 5 parts of zinc dioxide, 1 part of tetramethylthiuram disulphide and 0.5 part of mercaptobenzothiazole. The mixture thus obtained was vulcanized in a press for 30 minutes at 150° C.

A vulcanized lamina having the following characteristics was obtained.

Tensile strength—23.3 kg./cm.$^2$
Elongation at break—500%
Modulus at 300%—10.5 kg./cm.$^2$
Permanent set at break—8%

When, in addition to the above ingredients, 50 parts by weight of HAF carbon black were also added and the vulcanization was carried out as described above, a vulcanized lamina having the following characteristics was obtained:

Tensile strength—300 kg./cm.$^2$
Elongation at break—520%
Modulus at 300%—125 kg./cm.$^2$
Permanent set at break—8%

Another mix was prepared containing 100 parts by weight of the terpolymer, 1 part of phenyl-beta-naphthylamine, 2 parts of sulfur, 5 parts of zinc dioyide, 1 part of tetramethylthiuram disulphide, 0.5 part of mercapto- of naphthenic oil. The vulcanization was carried out as above; a vulcanized lamina having the following characteristics was obtained:

Tensile strength—285 kg./cm.$^2$
Elongation at break—600%
Modulus at 300%—100 kg./cm.$^2$
Permanent set at break—9%

EXAMPLE 2

200 cc. of anhydrous n-heptane and 7 cc. of trans-1,2-divinylcyclobutane were introduced into the apparatus described in Example 1, and held at −20° C. Through the gas inlet tube a gaseous mixture of propylene and ethylene in the molar ratio of 2:1 was introduced and circulated at the rate of 200 N liters/hour. In a 100 cc. flask kept under nitrogen, the catalyst was preformed at −20° C. by reacting 2 millimols of vanadium tetrachloride and 10 millimols of aluminum diethyl monochloride in 30 cc. of anhydrous n-heptane. The catalyst thus preformed was siphoned into the reactor under nitrogen pressure. The propylene-ethylene mixture was continuously fed and discharged at the rate of 400 N liters/hour.

After 45 minutes from the beginning, the reaction was stopped by adding 20 cc. of methanol containing 0.1 g. of phenyl-beta-naphthylamine. The product was purified and isolated as described in Example 1. After vacuum drying, 10 g. of a solid product were obtained which was amorphous by X-ray examination, had the appearance of a non-vulcanized elastomer and was completely soluble in boiling n-heptane. In the infrared spectrum the bands at 10 and 11 microns, attributable to the presence of vinyl groups, were visible. In the infrared spectrum also bands at 10.35 microns were present due to the presence of trans double bonds.

The ethylene-propylene-divinylcyclobutane terpolymer which contained 5% by weight of divinylcyclobutane was vulcanized by the method recited in Example 1. A vulcanized lamina having the following characteristics was obtained:

Tensile strength—19 kg./cm.$^2$
Elongation at break—380%
Modulus at 300%—14 kg./cm.$^2$
Permanent set at break—4%

EXAMPLE 3

200 cc. of anhydrous n-heptane and 7 cc. of trans-1,2-divinyl-cyclobutane were introduced into the apparatus described in Example 1 and held at −20° C. Through the gas inlet tube a gaseous mixture of propylene and ethylene in the molar ratio of 2:1 was introduced and circulated at the rate of 200 N l./hour.

In a 100 cc. flask kept under nitrogen the catalyst was preformed at −20° C., by reacting 2 millimols of vanadium tetrachloride and 5 millimols of aluminum trihexyl in 30 cc. of anhydrous n-heptane. The catalyst preformed was siphoned in the reactor under nitrogen pressure. The propylene ethylene mixture was continuously fed and discharged at the rate of 400 N l./hour. After 12 minutes from the beginning the reaction was stopped by the addition of 20 cc. methanol containing 0.1 g. of phenyl-beta-naphthylamine.

The product was purified and isolated as described in Example 1. After vacuum drying, 6 g. of a solid product, which was amorphous by X-rays examination, had the appearance of a non-vulcanized elastomer and was completely soluble in boiling n-heptane, were obtained.

In the infrared spectrum the bands at 10 and 11 microns, due to vinyl groups, were visible. The ethylene/propylene molar ratio in the copolymer obtained was 1.

The ethylene-propylene-divinylcyclobutane terpolymer was vulcanized as in Example 1.

A vulcanized lamina having the following characteristics was obtained:

Tensile strength—27 kg./cm.$^2$
Elongation at break—540%
Modulus at 300%—16 kg./cm.$^2$
Permanent set at break—14%

EXAMPLE 4

The reaction apparatus consists of a 100 cc. three necked flask provided with an agitator and gas inlet and outlet tubes, immersed in a thermostatic bath at −20° C. and held under nitrogen, 25 cc. of anhydrous n-heptane and 4 cc. of trans-1,2-divinylcyclobutane were introduced into the reactor.

Through the gas inlet tube a mixture containing radioactive ethylene and nitrogen in the ratio of 1:10 was introduced and circulated at the rate of about 30 N liters/hour.

In a 50 cc. flask, kept at −20° C. under nitrogen, the catalyst was preformed by reacting 2 millimols of vanadium tetrachloride and 10 millimols of aluminum diethyl monochloride in 15 cc. of anhydrous n-heptane. The catalyst thus preformed was siphoned into the reactor under nitrogen pressure.

The radioactive ethylene-nitrogen mixture was continuously fed and discharged at the rate of about 30 N liters/hour.

After 2 hours from the beginning, the reaction was stopped by adding 10 cc. of methanol containing 0.1 g. of phenyl-beta-naphthylamine.

The copolymer was purified and isolated as described in Example 1. After vacuum drying 1.1 g. of a solid product completely soluble in boiling n-heptane and having the appearance of a non-vulcanized elastomer was obtained.

The radiochemical exmaination revealed the presence of an ethylene amount corresponding to 35% by weight (65.5% by mols).

The infrared spectrographic examination showed the presence of unsaturations of the vinyl type (band at 11 microns) and of bands in the zone comprised between 13.3 ad 13.8 microns, due to methylenic sequences of various lengths.

The X-rays examination showed that the product was amorphous which demonstrates that divinylcyclobutane was really copolymerized with ethylene.

By operating as in Example 1, a vulcanized lamina which, in distinction from the non-vulcanized product, was insoluble in boiling organic solvents and had mechanical properties similar to those of the products of the preceding examples was obtained.

EXAMPLE 5

25 cc. of anhydrous n-heptane and 7 cc. of trans-1,2-divinylcyclobutane were introduced into the reaction apparatus described in Example 4, and held at −20° C.

Through the gas inlet tube a gaseous mixture containing radioactive ethylene and nitrogen in the molar ratio of 1:15 was introduced and circulated at the rate of 30 N liters/hour.

In a 50 cc. flask the catalyst was preformed by operating at −20° C. under nitrogen and reacting 2 millimols of vanadium tetrachloride and 5 millimols of trihexyl aluminum in 15 cc. of anhydrous n-heptane. The catalyst thus preformed was siphoned into the reactor under nitrogen pressure.

The ethylene-nitrogen mixture was continuously fed and discharged at the rate of 30 N liters/hour. After 3 hours from the beginning, the reaction was stopped by addition of 10 cc. of methanol containing 0.1 g. of phenyl-beta-naphthylamine.

The product was purified and isolated as described in Example 1. After vacuum drying, there were obtained 1.3 g. of a solid product which was amorphous by X-ray examination, was completely soluble in boiling n-heptane and had the appearance of a non-vulcanized elastomer.

A radiochemical examination revealed the presence of an ethylene amount corresponding to 28% by weight (60% by mols).

The infrared spectographic examination revealed the presence of unsaturations of the vinyl type (band at 11 microns) and of methylenic sequences of various lengths (bands at 13.3 and 13.8 microns). Also bands at 10.35 microns attributable to the presence of trans double bonds were present.

By operating as in Example 1 a vulcanized lamina was obtained which was insoluble in boiling organic solvents and had mechanical properties similar to those of the products of the preceding examples.

EXAMPLE 6

200 cc. of anhydrous n-heptane and 7 cc. of trans-1,2-divinylcyclobutane were introduced into the reaction apparatus described in Example 1, and immersed in a thermostatic bath at −20° C.

Through the gas inlet tube a gaseous mixture of propylene and ethylene in the molar ratio of 2:1 was introdduced and circulated at the rate of 200 N liters/hour.

In a 100 cc. flask kept under nitrogen the catalyst was preformed at −20° C. by reacting 2.8 millimols of vanadium triacetylacetonate and 14 millimols of aluminum diethyl monochloride in 30 cc. of anhydrous toluene. The catalyst was siphoned, thus preformed, into the reactor under nitrogen pressure.

The gaseous propylene-ethylene mixture was continuously fed and discharged at the rate of 400 N liters/hour.

After 20 minutes from the beginning a catalyst amount equal to the preceding one was introduced into the reactor.

After 1 hour, and 20 minutes from the beginning, the reaction was stopped by adding 20 cc. of methanol containing 0.1 g. of phenyl-beta-naphthylamine.

The polymer was purified in a separating funnel under nitrogen by repeated washings with aqueous hydrochloric acid and then with water and was coagulated in acetone.

After vacuum drying 13 g. of a solid white product which is amorphous by X-ray examination and has the appearance of a non-vulcanized elastomer was obtained.

The infrared spectrographic examination showed the absorption bands due to the presence of vinyl groups (bands at 10 and 11 microns).

100 parts by weight of ethylene-propylene-divinylcyclobutane copolymer were mixed in a laboratory roll mixer with 1 part of phenyl-beta-naphthylamine, 2 parts of sulfur 5 parts of zinc oxide, 1 part of tetramethylthiuram disulphide and 0.5 part of mercaptobenzothiazole.

The mix obtained was vulcanized in a press at 150° C. for 30 minutes. A vulcanized lamina having the following characteristics was otbained:

Tensile strength—23.3 kg./cm.$^2$
Elongation at break—500%
Modulus at 300%—10.5 kg./cm.$^2$
Permanent set at break—6%

EXAMPLE 7

200 cc. of anhydrous n-heptane and 7 cc. of trans-1,2-divinylcyclobutane were introduced into the reaction apparatus described in Example 1, and held at −20° C.

Through the gas inlet pipe a gaseous propylene-ethylene mixture in the molar ratio of 2:1 was introduced and circulated at the rate of 200 N liters/hour.

In a 100 cc. flask the catalyst was preformed at −20° C. under nitrogen by reacting 2 millimols of vanadium tetrachloride and 7.5 millimols of beryllium diethyl in 30 cc. of anhydrous n-heptane. The catalyst thus preformed was siphoned into the reactor by means of nitrogen pressure. The gaseous ethylene-propylene mixture was continuously fed and discharged at the flow rate of 200 N liters/hour.

After 15 minutes from the beginning, the reaction was stopped by adding 10 cc. of methanol containing 0.1 g. of phenyl-beta-naphthylamine.

The product was purified and isolated as described in Example 1. After vacuum drying, 4 grams of the solid product were obtained which appeared to be amorphous by X-ray examination, looked like a non-vulcanized elastomer, and was completely soluble in boiling n-heptane.

The infrared spectrographic examination showed the presence of vinyl groups (bands at 10 and 11 microns). The propylene/ethylene molar ratio was about 1:1. The ethylene - propylene - divinylcyclobutane was vulcanized with the composition and the process steps of Example 1.

A vulcanized lamina having the following characteristics was obtained:

Tensile strength—15 kg./cm.$^2$
Elongation at break—580%
Modulus at 300%—14 kg./cm.$^2$

EXAMPLE 8

Into the reaction apparatus described in Example 1, held at −20° C., 200 cc. of anhydrous n-heptane and 7 cc. of trans-1,2-divinylcyclobutane were introduced.

Through the gas inlet pipe a propylene-ethylene mixture in the molar ratio of 3:1 was introduced and circulated at the flow rate of 200 N liters/hour.

In a 100 cc. flask, the catalyst was preformed at −20° C. under nitrogen, by reacting 2 millimols of vanadyl trichloride and 10 millimols of aluminum diethyl monochloride in 30 cc. anhydrous n-heptane.

The catalyst thus preformed was siphoned into the reactor by means of nitrogen pressure. The gaseous mixture was continuously fed and discharged at the flow rate of 400 N liters/hour.

After 20 minutes from the beginning the reaction was stopped by adding 20 cc. of methanol containing 0.1 g. of phenyl-beta-napthylamine.

The product was purified and isolated as described in Example 1. After vacuum drying, 10 grams of the solid product were obtained which appeared to be amorphous by X-ray examination, looked like a non-vulcanized elastomer, and was completely soluble in boiling n-heptane.

The infrared spectrographic examination showed the presence of vinyl groups (bands at 10 and 11 microns). The ethylene/propylene molar ratio was about 1:1. The intrinsic viscosity, measured at 30° C. in toluene, was 2.1.

The copolymer was vulcanized with the composition and the process steps of Example 1.

A vulcanized lamina having the following characteristics was obtained:

Tensile strength—24 kg./cm.$^2$
Elongation at break—380%
Modulus at 300%—13 kg./cm.$^2$
Permanent set at break—6%

EXAMPLE 9

200 cc. of anhydrous n-heptane and 7 cc. of trans-1,2-divinylcyclobutane were introduced into the apparatus described in Example 1, and held at −20° C.

Through the gas inlet tube a gaseous mixture of propylene and ethylene in the molar ratio of 2:1 was introduced and circulated at the rate of 200 N liters/hour.

In a 100 cc. flask kept under nitrogen, the catalyst was preformed at −20° C. by reacting 2 millimols of vanadium tetrachloride and 5 millimols of 2-methyl-1,4-di(diisobutylaluminum) butane in 30 cc. of anhydrous n-heptane. The catalyst thus preformed was siphoned into the reactor under nitrogen pressure. The gaseous propylene-ethylene mixture as continuously fed and discharged at the rate of 400 N liters/hour.

After 12 minutes from the beginning the reaction was stopped by adding 20 cc. of methanol containing 0.1 g. of phenyl-beta-naphthylamine.

The product was purified and isolated as described in Example 1. After vacuum drying, 7 grams of the solid product were obtained which was amorphous by X-ray examination, looked like a non-vulcanized elastomer and was completely soluble in boiling n-heptane. In the infrared spectrum of the product the bands at 10 and 11 microns, attributable to the presence of vinyl groups, were visible. The ethylene/propylene molar ratio was about 1:1.

The ethylene-propylene - divinylcyclobutane terpolymer was vulcanized by using the composition and process steps of Example 1.

A vulcanized lamina having the following characteristics was obtained:

Tensile strength—25 kg./cm.$^2$
Elongation at break—520%
Modulus at 300%—13 kg./cm.$^2$

EXAMPLE 10

200 cc. of anhydrous n-heptane and 7 cc. of trans-1,2-divinylcyclobutane were introduced into the reaction apparatus of Example 1, kept at −10° C.

Through the gas inlet tube a gaseous mixture of ethylene-propylene-butene-1 in the molar ratio of 1:2:2 was introduced and circulated at the rate of 200 N liters/hour.

In a 100 cc. flask kept under nitrogen the catalyst was preformed at −10° C. by reacting 1 millimole of vanadium tetrachloride and 5 millimoles of aluminum diethylmonochloride in 30 cc. of anhydrous n-heptane. The catalyst thus preformed was siphoned into the reactor under nitrogen atmosphere.

The gaseous ethylene-propylene-butene-1 mixture was continuously fed and discharged at the rate of 400 N liters/hour.

After 7 minutes the reaction was stopped by adding 20 cc. of methanol containing 0.1 g. of phenyl-beta-naphthylamine.

The product was purified and isolated as described in Example 1. After vacuum drying, 11 grams of a solid product were obtained which was amorphous by X-ray examination, looked like a non-vulcanized elastomer and was completely soluble in boiling n-heptane. Infrared examination showed the presence of vinyl groups (bands at 10 and 11 microns), of trans double bonds (band at 10.35 microns) of methylenic sequences of various length (bands comprised between 13 and 13.8 microns) of methyl groups (band at 7.25 microns) and of ethyl groups (bands at 12.95–13 microns) in an amount corresponding to about the half of the one of the methyl groups.

The ethylene - propylene - butene - divinylcyclobutane copolymer was vulcanized with the aid of the same composition and process steps as in Example 1.

A vulcanized lamina having the following characteristics was obtained:

Tensile strength—27 kg./cm.$^2$
Elongation at break—420%
Modulus at 300%—13 kg./cm.$^2$

EXAMPLE 11

200 cc. of tetrachloroethylene and 7 cc. of trans-1, 2-divinylcyclobutane are introduced into the reaction apparatus of Example 1 kept at −20° C.

Through the gas inlet tube a gaseous ethylene-propylene mixture in the molar ratio of 1:2 is introduced and circulated at the rate of 200 N liters/hour.

In a 100 cc. flask kept under nitrogen the catalyst is preformed at −20° C. by reacting 1 millimole of vanadium tetrachloride and 5 millimoles of aluminum diethyl monochloride in 30 cc. of anhydrous n-heptane. The catalyst thus preformed is siphoned into the reactor under nitrogen atmosphere.

The gaseous ethylene-propylene mixture is continuously fed and discharged at the rate of 400 N liters/hour.

After 20 minutes the reaction is stopped by adding 20 cc. of methanol containing 0.1 g. of phenyl-beta-naphthylamine. The product is purified and isolated as described in Example 1. After vacuum drying 12 g. of a solid product which is amorphous at X-ray examination, looks like a non-vulcanized elastomer and is completely soluble in boiling n-heptane, are obtained.

Infrared spectrographic examination shows the presence of vinyl groups (bands at 10 and 11 microns). The ethylene-propylene molar ratio is about 1:1. The product is vulcanized with the aid of the same mix and with the same modalities of Example 1. A vulcanized lamina having the following characteristics is obtained:

Tensile strength—34 kg./cm.$^2$
Elongation at break—420%
Modulus at 300%—12 kg./cm.$^2$
Permanent set at break—8%

EXAMPLE 12

The reaction apparatus is a glass vessel having a volume of 1.5 l. provided with stirrer and inlet tube for the gases. 1000 cm.$^3$ of liquid propylene and 80 cm.$^3$ of trans 1-vinyl-2-isopropenyl-cyclobutane are introduced into the autoclave kept at −10° C. Ethylene is introduced up to a pressure of 0.9 atm. The two catalyst components are then separately fed into the reactor, at first 11 millimoles of aluminum diethylmonochloride dissolved in 11 cm.$^3$ of anhydrous n-heptane and then 2.5 millimoles of VOCl$_3$ dissolved in 2.5 cm.$^3$ of anhydrous n-heptane.

The polymerization starts immediately and a product which is insoluble in the reaction medium is formed. The temperature is kept at −10° C. and the pressure is kept constant by feeding the ethylene absorbed during the polymerization. After 50 minutes the reaction is stopped. The olefins are removed and the product is purified in a separatory funnel by repeated treatments with aqueous hydrochloric acid and then with water. The product is then coagulated with acetone. After vacuum drying, 80 g. of a solid product are obtained which is amorphous at the X-rays, looks like a non-vulcanized elastomer and is completely soluble in boiling n-heptane.

IR spectrographic examination shows the presence of trans unsaturations (bands at 10 and 11$\eta$). The propylene content is 60% by weight. 100 parts by weight of the terpolymer are mixed in a laboratory roll mixer with 50 parts of HAF black, 1 part of phenyl-beta-naphthylamine, 2 parts of sulfur, 5 parts of zinc oxide, 1 part of tetramethylthiuramedisulfide and 0.5 part of mercaptobenzothiazole. The mix is vulcanized in a press at 150° C. during 60 minutes.

A vulcanized lamina having the following characteristics is obtained:

Tensile strength—175 kg./cm.$^2$
Elongattion at break—360%
Modulus at 300%—152 kg./cm.$^2$

EXAMPLE 13

The reaction apparatus consists of a three-necked 100 cm.$^3$ flask provided with stirrer and with inlet and outlet tubes for the gases. The gas inlet tube reaches the cylinder bottom and ends in a porous diaphragm. 50 cm.$^3$ of anhydrous n-heptane and 1.5 cm.$^3$ of trans-1-vinyl-2-isopropenylcyclobutane are introduced into the reactor which is kept at −20° C.

Through the gas inlet tube a gaseous propylene-ethylene mixture in the molar ratio 2:1 is introduced and circulated at the rate of 75 N l./h. The catalyst is preformed in a 100 cm.$^3$ flask by operating at −20° C. under nitrogen atmosphere and by reacting in 25 cm.$^3$ of anhydrous n-heptane 0.5 millimole of vanadium tetrachloride and 2.5 millimoles of aluminum diethylmonochloride.

The thus preformed catalyst is siphoned into the reactor by means of nitrogen pressure. The gaseous ethylene-propylene mixture is continuously fed and discharged at the rate of 75 N l./h. 20 minutes after the introduction of the catalyst the reaction is stopped by adding 10 cm.$^3$ of methanol containing 0.1 g. phenyl-beta-naphthylamine. The product is purified in a separatory funnel in the usual way.

After vacuum drying, 3.1 g. of a solid product are obtained which is amorphous at the X-rays, looks like a non-vulcanized elastomer and is completely soluble in boiling n-heptane. IR spectrographic examination shows the presence of vinylidene groups (band at 11.2$\eta$) and of trans double bonds (band at 10.35$\eta$). The ethylene-propylene molar ratio is about 1:1.

The terpolymer is vulcanized with the same mix and under the same conditions of the preceding examples.

A vulcanized lamina having following characteristics is obtained:

Tensile strength—162 kg./cm.$^2$
Elongation at break—470%
Modulus at 200%—55 kg./cm.$^2$
Modulus at 300%—98 kg./cm.$^2$
Permanent set—12%

EXAMPLE 14

The reaction apparatus consists of a 100 cm.$^3$ three necked flask provided with an agitator and gas inlet and outlet tubes, immersed in a thermostatic bath and held under nitrogen.

Into this reaction apparatus kept at −20° C. 50 cm.$^3$ of anhydrous n-heptane and 1.5 cm.$^3$ of trans 1-vinyl-2-isopropenylcyclobutane are introduced. Through a gas inlet tube a gaseous propylene-ethylene mixture in the molar ratio of 2:1 is introduced and circulated at the rate of 75 N l./h.

The catalyst is preformed in a 100 cm.$^3$ flask by operating at −20° C. under nitrogen atmosphere by reacting in 25 cm.$^3$ of anhydrous n-heptane 0.5 millimole of vanadium tetrachloride and 2.5 millimoles of aluminum diethylmonochloride. The thus preformed catalyst is siphoned into the reactor by means of nitrogen pressure. The gaseous monomer mixture is introduced and discharged at the rate of 75 N l./h. 20 minutes after the introduction of the catalyst the reaction is stopped by adding 10 cm.$^3$ of methanol containing 0.1 g. of phenyl-beta-naphthylamine. The product is purified in a separatory funnel by means of repeated washing with diluted hydrochloric acid and then with water and is coagulated with acetone.

After vacuum drying, 3.1 g. of solid product, which is amorphous at the X-rays, looks like a non-vulcanized elastomer and is completely soluble in boiling n-heptane are obtained. Infrared spectrographic examination shows the presence of vinylidene groups (bands at 11.2 microns) and of trans double bonds (band at 10.35 microns). The ethylene-propylene molar ratio is about 1:1.

100 parts by weight of terpolymer are mixed in a laboratory roll mixer with 1 part of phenyl-beta-naphthylamine, 1.5 parts of sulfur, 5 parts of zinc oxide, 1.5 parts of tetramethyl thiuram-mono-sulfide, 5 parts of HAF carbon black and 0.5 part of mercaptobenzothiazole. The mix is vulcanized in a press at 150° C. for 60 minutes.

A vulcanized lamina having the following characteristics is obtained:

Tensile strength—162 kg./cm.$^2$
Elongation at break—470%
Modulus at 200%—55 kg./cm.$^2$
Modulus at 300%—98 kg./cm.$^2$
Permanent set—12%

EXAMPLE 15

The reaction apparatus consists of a glass cylinder having a diameter of 5.5 cm. and a capacity of 750 cm.$^3$, provided with a stirrer and gas inlet and outlet tubes, immersed in a thermostatic bath at −20° C.

The gas inlet tube reaches the bottom of the cylinder and ends with a porous diaphragm (diameter 3.5 cm.).

200 cm.$^3$ of anhydrous n-heptane and 7 cm.$^3$ of trans 1,2-divinylcyclopropane are introduced into the reaction apparatus.

Through the gas inlet tube a gaseous mixture of ethylene and propylene in the molar ratio of 1:2 is introduced and circulated at the rate of 200 N l./h. In a 100 cm.$^3$ flask, kept under nitrogen the catalyst is preformed at −20° C. by reacting 1 millimole of vanadium tetrachloride and 5 millimoles of aluminum diisobutylmonochloride in 30 cm.$^3$ of anhydrous n-heptane. The thus preformed catalyst is siphoned into the reactor by means of nitrogen pressure. The ethylene/propylene mixture is continuously fed and discharged at the rate of 400 N l./h.

After 30 minutes from the beginning the reaction is stopped by adding 20 cm.$^3$ of methanol containing 0.1 g. of phenyl-beta-naphthylamine.

The product is purified and isolated as described in Example 1. After vacuum drying, 6 g. of a solid product which is amorphous at the X-rays, looks like a non-vulcanized elastomer and is completely soluble in boiling n-heptane, are obtained. The infrared spectrographic examination shows the presence of vinyl groups (bands at 10 and 11 microns). The ethylene/propylene molar ratio is about 1:1.

The terpolymer contains about 1.8% by moles of diene.

The terpolymer is vulcanized with the same mix and the same modalities of Example 1.

A vulcanized lamina having the following characteristics is obtained: (in the mix no HAF black is used).

Tensile strength—35 kg./cm.$^2$
Elongation at break—420%
Modulus at 300%—13 kg./cm.$^2$

EXAMPLE 16

The reaction apparatus consists of a 100 cm.$^3$ three necked flask provided with an agitator and gas inlet and outlet tubes, immersed in a thermostatic bath and held under nitrogen. 50 cm.$^3$ of anhydrous n-heptane and 1.2 cm.$^3$ of cis 1,2-divinylcyclobutane are introduced into this reaction apparatus kept at −10° C.

Through the gas inlet tube a gaseous ethylene/propylene/butene-1 mixture is introduced and circulated at the rate of 250 N l./h.

The catalyst is preformed in a 50 cm.$^3$ flask by reacting in 25 cm.$^3$ of anhydrous n-heptane 0.5 millimole of VCl$_4$ and 2.5 millimoles of aluminum diethylmonochloride. The thus preformed catalyst is siphoned into the reactor by means of nitrogen pressure. The ethylene-propylene mixture is continuously fed and discharged at the rate of 250 N l./h. After 16 minutes the reaction is stopped by adding 5 cm.$^3$ of methanol containing 0.1 g. of phenyl-beta-naphthylamine. The product is purified and isolated as described in Example 1. After vacuum drying, 1.8 g. of a solid product which is amorphous at the X-rays, looks like a non-vulcanized elastomer and is completely soluble in boiling n-heptane, are obtained.

The infrared spectrographic examination shows the presence of vinyl groups (bands at 10 and 11 microns). The alpha-olefin content is about 40% by moles. The diene content is about 0.9% by moles.

It will be apparent from the foregoing that the copolymerizates of ethylene, and/or a higher alpha-olefin, and a polyalkenylcycloalkane differ unexpectedly in the convertibility thereof to useful synthetic rubbers depending on the particular polyalkenylcycloalkane used as one starting monomer, and the polymerization catalyst used.

Some variations may be made in details in practicing the invention without departing from the spirit thereof. Therefore, we intend to include in the scope of the appended claims all modifications or changes in details which will be obvious to those skilled in the art from the description and illustrative working examples given herein.

What is claimed is:

1. High molecular weight, substantially linear, substantially amorphous copolymerizates of at least one monoolefin selected from the group consisting of ethylene and higher alpha-olefins having the general formula CH$_2$=CH—R in which R is an alkyl radical containing 1 to 6 carbon atoms and at least one polyalkenylcycloalkane containing 3–4 carbons in the cycloalkane ring, said copolymerizates being characterized in consisting essentially of macromolecules each made up of polymerized units of each of the starting monomers; in that each polymerized unit of the polyalkenylcycloalkane contains a free double bond; and in being sulfur-vulcanizable to elastomers having the combination of high tensile strength, high elongation at break, and low permanent set at break which is characteristic of commercially acceptable synthetic rubbers.

2. Copolymerizates according to claim 1, characterized in consisting essentially of macromolecules made up of polymerized units of ethylene, of propylene and of the polyalkenylcycloalkane.

3. Copolymerizates according to claim 2, further characterized in containing from about 20% to about 70% by weight of ethylene.

4. Copolymerizates according to claim 1, characterized in consisting essentially of macromolecules each made up of polymerized units of ethylene, butene-1 and of the polyalkenylcycloalkane.

5. Copolymerizates according to claim 4, further characterized in containing from about 20% to about 70% by weight of ethylene.

6. Copolymerizates according to claim 1, characterized in consisting essentially of macromolecules each made up of polymerized units of ethylene, of propylene, and of trans-1,2-divinylcyclobutane.

7. Copolymerizates according to claim 1, characterized in consisting essentially of macromolecules each made up of polymerized units of ethylene, of propylene, and of cis-1,2-divinylcyclobutane.

8. Copolymerizates according to claim 1, characterized in consisting essentially of macromolecules each made up of polymerized units of ethylene, of propylene and of trans-1,2-divinylcyclopropane.

9. Copolymerizates according to claim 1, characterized in consisting essentially of macromolecules each made up of polymerized units of ethylene, of propylene, and of 1-vinyl-2-isopropenylcyclobutane.

10. Copolymerizates according to claim 1, characterized in consisting essentially of macromolecules each made up of polymerized units of ethylene, of propylene, and of 1,2-divinyl-1,2-dimethylcyclobutane.

11. Copolymerizates according to claim 1, characterized in consisting essentially of macromolecules each made up of polymerized units of ethylene, of propylene, and of 1-vinyl-1-methyl-2-isopropenylcyclobutane.

12. The copolymers of claim 1, sulfur-vulcanized to elastomeric materials.

References Cited

UNITED STATES PATENTS 3,222,331  12/1965  Duck _____ 260—80.5

FOREIGN PATENTS 1,023,251  3/1966  Great Britain _____ 260—80.78
1,023,285  3/1966  Great Britain _____ 260—80.78

JOSEPH L. SCHOFER, Primary Examiner

C. A. HENDERSON, Jr., Assistant Examiner

U.S. Cl. X.R.

260—41.5, 80.78